Patented Dec. 15, 1925.

1,565,864

UNITED STATES PATENT OFFICE.

EARL B. PUTT, OF NEW YORK, N. Y., ASSIGNOR OF ONE-THIRD TO HERMAN THEAMAN AND ONE-THIRD TO MAURICE BLUHM, BOTH OF NEW YORK, N. Y.

METHOD OF CONVERTING VEGETABLE FIBER TO PULVERIZED FORM.

No Drawing. Application filed July 15, 1925. Serial No. 43,885.

*To all whom it may concern:*

Be it known that I, EARL B. PUTT, a citizen of the United States, residing at New York city, in the county of New York and State of New York, have invented certain new and useful Improvements in Methods of Converting Vegetable Fiber to Pulverized Form, of which the following is a specification.

This invention relates to the process and method of converting vegetable fiber to a pulverizable form whereby it may be utilized as a base in the preparation of pharmaceutical, medical or chemical compounds.

One of the objects of my invention is directed to the process of treating and converting a vegetable fiber to a pulverized base without destroying its structural or cell-like formation as distinguished from viscose material prepared by actual solution and subsequent precipitation of the cellulose powder.

Another object of my invention resides in the process and method of treating vegetable fiber and converting it into a suitable base capable of freely absorbing or combining with suitable binding agents to produce dentifrices, massage or cleansing creams and other pharmaceutical and chemical products.

In order to more fully understand and appreciate my invention and particularly the manufacturing process followed in producing what I consider a new structural, cellulose base, the following procedure is resorted to in obtaining the desired product.

A quantity of sulphite wood pulp, paper pulp or fiber, such as is used in filtering material known as filter mass, is first heated and treated to remove any moisture present. To one part of the dry fiber I add about twenty parts of dilute acid such as sulphuric acid, or reversely, place the fiber into the acid. When the fiber is thoroughly impregnated in the liquid, the mixture is heated in a suitable vessel for about thirty minutes with occasional stirring. The mixture is then permitted to settle and the fiber is filtered off. The completion of the reaction is indicated by the settling of the fiber to the bottom of the vessel in finely divided but still distinctly fibrous form. The fiber is then thoroughly washed with water as often as is necessary until the acid is entirely washed out, the apparatus being used for this step may be a filter press or centrifuge. The fiber mass is then thoroughly dried and reduced to a powder in an ordinary mill or before the mass is dried, the moist fiber may be used directly as a source of absorbing a frictional or binding agent, as in the manufacture of dentifrices, massage and cleansing creams or other allied products.

I have found that heating the fiber mass with a ten percent sulphuric acid for about 30 minutes at a temperature of about 103 degrees centigrade, gives uniformly good results. An equally good base is also obtained by longer heating with a more dilute acid or a shorter heating period with a stronger acid. However, where a stronger acid is used, care must be taken that the acid be not too strong as to cause charring of the mass. Hydrochloric acid may also be used but does not possess any advantage over sulphuric acid or other mineral acids. A shorter heating period under pressure with either sulphuric or hydrochloric acid also yields a good pulverizable product. Rag pulp fiber may be used as well as sulphite wood fiber but the rag fiber is softer and requires less heating with the acid to convert it to a pulverizable form.

In actual practice, I have found that considerable latitude is permissible in the preparation of the fiber for certain uses and purposes. For instance, in preparing the mass for dentifrices, it is not necessary to convert all of the fiber in a batch to fine powder because if only a part of it is so converted, either in the wet form or after drying, the substance so formed acts as a binder in holding the other fibers in paste form. The prepared fiber is insoluble in water and acts somewhat like a gum in having the property of absorbing water to form a paste. However, it is totally different from the well known viscose material prepared by actual solution and subsequent precipitation of the cellulose powder.

In preparing the mass, care must be taken in the use of the proper apparatus and avoid contamination of the fiber with the metallic containers. By using pure acids with subsequent careful washing, the final prepared fiber is sufficiently pure to be used in food products, dental, medicinal or other chemical preparations.

If the moist fiber is used instead of drying and finally powdering, it should be preserved with benzoate of soda, formaldehyde or other suitable preservatives where it is desired to store the mass for any length of time. Before using the mass in the preparation of suitable products, the preservative can be then washed out of the fiber, if so desired by simply washing the fiber with water.

While I have found that a proportion of one part of fiber to twenty parts of dilute acid is a convenient one to handle, nevertheless it is possible to utilize less acid with equally satisfactory results, the determination of this factor depending upon the quantity of fiber that must be stirred or agitated. The proportion of one part fiber to twenty parts acid produces a thick mixture that can be stirred readily so that if less liquid, or dilute mineral acid, is used, a heavier stirrer may be required.

After using the dilute acid for one batch of prepared fiber, the acid filtered off from the finished product may be used over again for converting a new batch of fiber. I have found it practicable to use the acid three times before discarding in which condition it becomes dark in color but otherwise very effective in converting the fiber to a condition whereby it may be pulverized. The fiber prepared according to the above method, if handled in the proper vessels and with pure acid, is pure enough to be used in food products.

Having described my invention what I now claim as new and desire to secure by Letters Patent of the United States is:—

1. The process of converting a vegetable fiber to a pulverized, structural form which consists in immersing a quantity of said fiber in a dilute acid, heating the mixture until the fiber settles, filtering the fiber from the acid, washing and then drying the filtered mass and then pulverizing the product.

2. The process of converting a vegetable fiber to a pulverized, structural form which consists in immersing a quantity of filter mass in a dilute mineral acid, heating the mixture until the fiber settles, filtering the fiber from the acid, washing the filtered mass and then pulverizing the product.

3. The process of converting a vegetable fiber to a pulverized, structural form which consists in immersing a quantity of fiber in dilute sulphuric acid, heating the mixture until the fiber settles, filtering the fiber and washing the mass until the acid is removed, drying the washed mass and then pulverizing the product.

4. The process of converting a vegetable fiber to a pulverized, structural form which consists in immersing one part fiber in twenty parts of dilute acid, heating the mixture until the fiber settles, filtering the fiber and then washing the mass until the acid is removed, and then pulverizing the washed mass.

5. The process of converting a vegetable fiber to a pulverized, structural form which consists in immersing one part fiber in twenty parts of a ten percent mineral acid, heating the mixture to approximately 103 degrees centigrade for thirty minutes, filtering the mass, washing the filtered mass with water until the acid is removed, drying the mass and then pulverizing.

6. The process of converting a vegetable fiber to a pulverized, structural form which consists in immersing one part of filter mass to twenty parts of ten percent sulphuric acid, heating the mixture to approximately 103 degrees for a period of about thirty minutes, filtering the mass, washing the filtered mass with water until the acid is removed and then pulverizing the said mass in either the dry or wet state.

In testimony whereof I affix my signature this 16 day of June, 1925.

EARL B. PUTT.